United States Patent [19]

Wakao

[11] 4,349,356
[45] Sep. 14, 1982

[54] PROCESS AND APPARATUS FOR CONCENTRATING A COMPONENT OF A GASEOUS MIXTURE

[75] Inventor: Noriaki Wakao, Zushi, Japan
[73] Assignee: Toyo Engineering Corporation, Japan
[21] Appl. No.: 121,592
[22] Filed: Feb. 14, 1980

[30] Foreign Application Priority Data

Mar. 9, 1979 [JP] Japan .................................. 54/26709

[51] Int. Cl.³ ............................................. B01D 53/22
[52] U.S. Cl. ........................................... 55/16; 55/71
[58] Field of Search .............................. 55/16, 71, 158

[56] References Cited

U.S. PATENT DOCUMENTS

| | | | |
|---|---|---|---|
| 820,283 | 5/1906 | Clamond | 55/16 |
| 2,422,882 | 6/1947 | Bramley | 55/16 X |
| 2,540,152 | 2/1951 | Weller | 55/16 |
| 2,892,508 | 6/1959 | Kohman et al. | 55/16 |
| 2,964,124 | 12/1960 | Peierls et al. | 55/16 |
| 3,019,853 | 2/1962 | Kohman et al. | 55/16 |
| 3,405,510 | 10/1968 | Seal | 55/158 X |
| 3,792,570 | 2/1974 | Biondi et al. | 55/16 |
| 3,797,200 | 3/1974 | Klass et al. | 55/16 |
| 3,818,679 | 6/1974 | Klass et al. | 55/16 |

FOREIGN PATENT DOCUMENTS 1324356 12/1963 France .................................. 55/16

OTHER PUBLICATIONS

Perry, *Chemical Engineer's Handbook*, 1963, pp. 17–38.

*Primary Examiner*—Robert H. Spitzer
*Attorney, Agent, or Firm*—McGlew and Tuttle

[57] ABSTRACT

Disclosed is a process for concentrating a component of a gaseous mixture by the utilization of Knudsen diffusion, the process comprising the steps of feeding the gaseous mixture in the form of a pulse to one surface of a porous membrane and collecting the gas diffused out of the opposite surface of the membrane during a short transient period. Also disclosed are a continuous process based on the same principle and apparatus for carrying out this continuous process.

3 Claims, 2 Drawing Figures

PROCESS AND APPARATUS FOR CONCENTRATING A COMPONENT OF A GASEOUS MIXTURE

BACKGROUND OF THE INVENTION (1) Field of the Invention

This invention relates to a novel improved process and apparatus for concentrating a component of a gaseous mixture by the utilization of Knudsen diffusion.

(2) Description of the Prior Art

When a gas diffuses through a pore under Knudsen's conditions, its diffusion rate is inversely proportional to the square root of its molecular weight. Accordingly, a gaseous mixture may be subjected to Knudsen diffusion in order to concentrate its lighter component having a higher diffusion rate. This is a well-known fact and, in the prior art, a process has been available in which the lighter component of a gaseous mixture is concentrated and/or separated by feeding the gaseous mixture in a steady state to one surface of a porous membrane. However, the conventional steady-state diffusion process gives only a low enrichment factor for a single stage and hence requires a very large number of stages, which often makes this process impracticable for industrial purposes.

SUMMARY OF THE INVENTION

It is an object of this invention to provide a process for concentrating a component of a gaseous mixture which process can achieve a remarkably high enrichment factor for a single porous membrane, i.e., for a single stage.

It is another object of this invention to provide a process for concentrating the lighter component of a gaseous mixture which process can achieve a desired enrichment factor with a smaller number of stages.

It is still another object of this invention to provide a process and apparatus which permit a gas enriched with a component of a gaseous mixture to be collected and withdrawn continuously.

In accordance with this invention, a component of a gaseous mixture is concentrated by the utilization of Knudsen diffusion. Specifically, the gaseous mixture is fed in the form of a pulse to one surface of a porous membrane, and the gas diffused out of the opposite surface of said membrane during a short transient period and hence enriched with the lighter component of the gaseous mixture is collected.

The above process can be carried out in a continuous manner by feeding the gaseous mixture continuously to a gas-feeding compartment having at least one boundary wall constituted of a porous membrane. The membrane constituting at least one of the boundary walls of the gas-feeding compartment is moved so that its portion to be contacted with the gaseous mixture will be renewed at short intervals of time, i.e., so that the gaseous mixture will always be fed in the form of a pulse to one surface of the membrane. Then, the gas diffused out of the opposite surface of the membrane and hence enriched with the lighter component of the gaseous mixture is collected. On the other hand, the gas left in the gas-feeding compartment is enriched with the heavier component of the gaseous mixture.

DETAILED DESCRIPTION OF THE INVENTION

Figure 1:
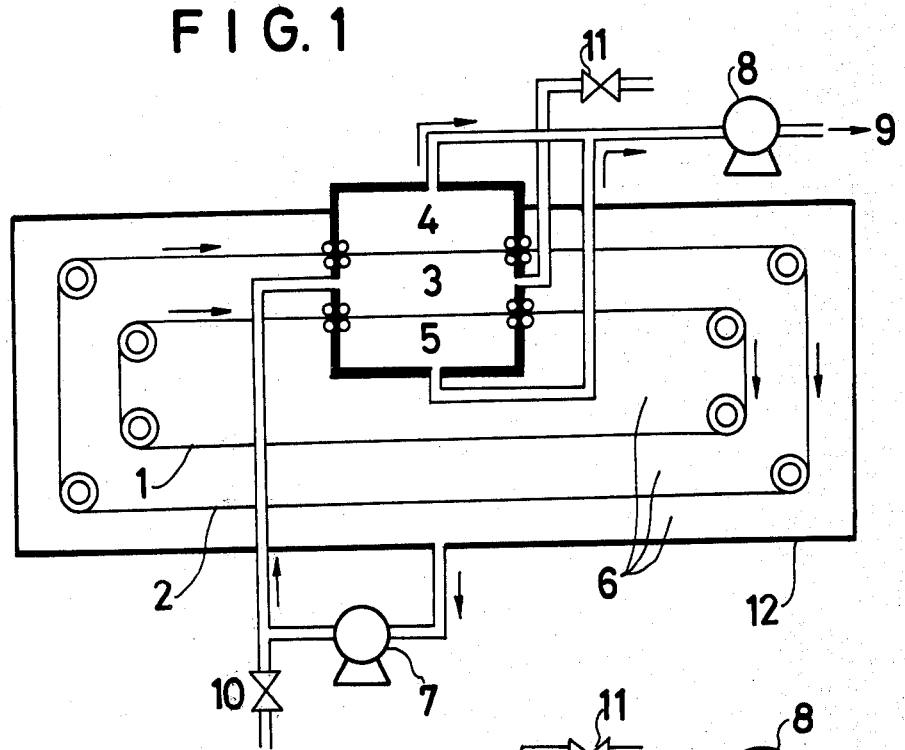
FIG. 1 is a diagrammatic illustration of a running-belt type concentrator suitable for carrying out the continuous process of this invention.

When it is desired to concentrate the lighter component of a gaseous mixture, and when there is no significant difference in molecular weight between the lighter and the heavier component, the difference in Knudsen diffusion coefficient is so small that the steady-state diffusion process gives only a low enrichment factor for the lighter component.

However, if our attention is directed to the transient state, it may be readily understood that the lighter and the heavier component begin to diffuse competitively through the membrane at the moment when the gaseous mixture is fed to on surface of the membrane. Because of the higher Knudsen diffusion coefficient, the lighter component first begins to emerge from the opposite surface of the membrane. The heavier component begins to emerge from the opposite surface of the membrane a little later than the lighter one. However, after enough time has been elapsed, both the lighter and the heavier component diffuse through the membrane and emerge from the opposite surface thereof in a steady state. For this reason, the steady-state diffusion process gives only a low enrichment factor for the lighter component. Nevertheless, as described above, the gas diffused out of the opposite surface of the membrane during a short transient period contains an overwhelmingly large amount of the lighter component. That is to say, a very high enrichment factor can be achieved. Steady-state diffusion gives only a low enrichment factor for a single stage and hence requires a large number of stages, but the utilization of a transient period enhances the enrichment factor for a single stage and thereby causes a substantial reduction in the total number of stages.

This principle will hereinafter be discussed from a mathematical point of view.

When a gas having a concentration C (in moles/c.c) is fed in the form of a pulse to one surface of a porous membrane, and when the concentration of the gas is low at the opposite surface of the membrane, the amount S (in moles/cm$^2$) of the gas diffused out of the opposite surface of the membrane until a time T (in seconds) elapses is theoretically given by $$S = aLCR \qquad (1)$$

where $$R = X + 2 \sum_{n=1}^{\infty} \frac{(-1)^n}{(n\pi)^2} [1 - e^{-(n\pi)^2 X}]$$

In Equation (1), X is defined by $$X = DT/aL^2$$

where D is the intramembranous Knudsen diffusion coefficient (in cm$^2$/sec), L is the thickness (in cm) of the membrane, and a is the porosity of the membrane.

Let $M_1$, $D_1$, $R_1$ and $C_1$ be the molecular weight of the lighter component, the intramembranous Knudsen diffusion coefficient for the lighter component, the value of R for the lighter component, and the concentration of the lighter component in the gaseous mixture, respectively. $M_2$, $D_2$, $R_2$ and $C_2$ are similarly defined for the heavier component. Then, while the concentration ratio of the lighter to the heavier component is $C_1/C_2$ for the gaseous mixture before diffusion, it becomes $S_1/S_2=(C_1/C_2)(R_1/R_2)$ after diffusion through a single porous membrane. The gas obtained from this first stage is fed to a second stage. Then, the concentration ratio becomes $(C_1/C_2)(R_1/R_2)^2$ for the gas obtained from the second stage. Thus, the concentration ratio increased by a factor of $(R_1/R_2)$ each time the gas passes through an additional stage.

Now, the enrichment factor for a single stage is defined by the increment in concentration ratio, or $$R_1/R_2 - 1 \qquad (2)$$

In the case of steady-state diffusion, it can be assumed that $T=\infty$ and hence $X=\infty$ in Equation (1). Then, the enrichment factor is $D_1/D_2 - 1$. Since $D_1/D_2 = \sqrt{M_2/M_1}$, the enrichment factor can be expressed as follows:

$$\sqrt{\frac{M_2}{M_1}} - 1 \qquad (3)$$

However, it can be seen from Equation (1) that, if T is small, the enrichment factor is much higher than the value calculated from Equation (3). In accordance with this invention, therefore, the lighter component can be concentrated with correspondingly higher efficiency.

In carrying out the process of this invention, the pulse duration during which the gaseous mixture is fed to one surface of the membrane is preferably not more than $X=0.4$ and more preferably not more than $X=0.2$. The length of the transient period during which the gas diffused out of the opposite surface of the membrane is collected is preferably not less than $X=0.01$ and more preferably not less than $X=0.03$.

Next, the continuous process of this invention and the apparatus for carrying out it will hereinafter be described with reference to several embodiments thereof.

FIG. 1 illustrates a running-belt type concentrator having a housing 12. Within this housing 12, two porous membranes 1 and 2 in belt form are positioned and a part of the space therebetween is partitioned to form a gas-feeding compartment 3. Above and below this gas-feeding compartment 3 are provided gas-collecting compartments 4 and 5, respectively.

Figure 2:
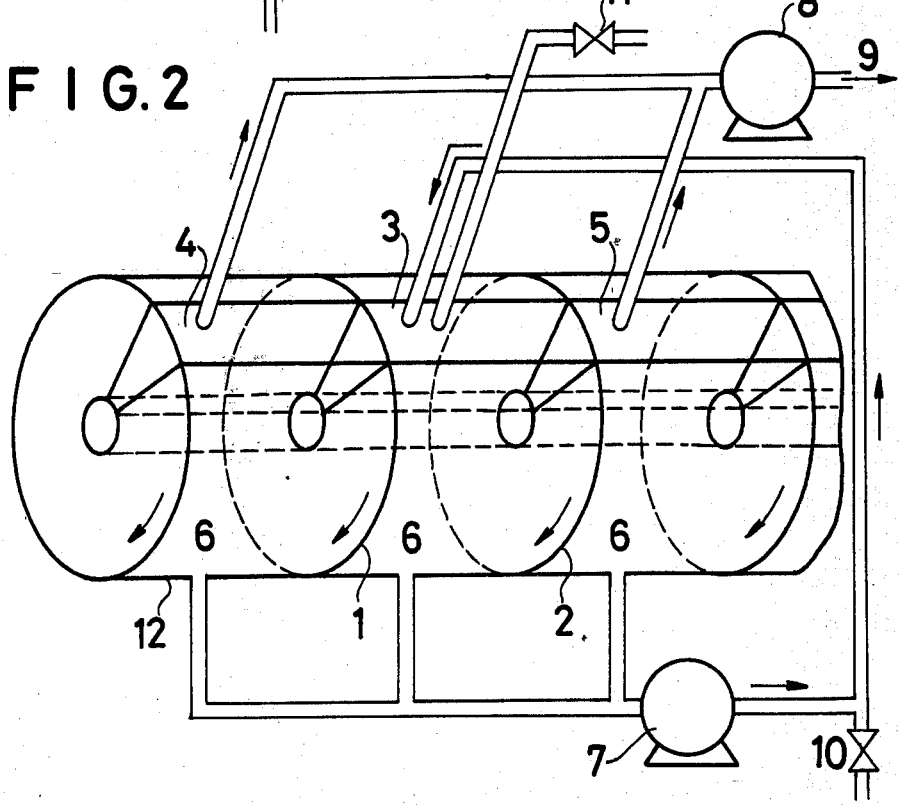
FIG. 2 is a diagrammatic illustration of a rotating-disc type concentrator suitable for carrying out the continuous process of this invention.

FIG. 2 illustrates a rotating-disc type concentrator having a housing 12. Within this housing 12, two porous membranes 1 and 2 in disc form are positioned in close contact with the inner surface thereof. Then, as illustrated in FIG. 2, a part of the space between membranes 1 and 2 is partitioned to form a gas-feeding compartment 3. On the left and right sides of this gas-feeding compartment 3 are provided gas-collecting compartments 4 and 5, respectively.

In either of the concentrators illustrated in FIGS. 1 and 2, both gas-collecting compartments 4 and 5 are connected to a vacuum pump 8. A gaseous mixture is fed to gas-feeding compartment 3 by way of a valve 10. The gaseous mixture so fed diffuses through membranes 1 and 2 into gas-collecting compartments 4 and 5. Then, the time during which the gaseous mixture present in gas-feeding compartment 3 is contacted with one surface of membranes 1 and 2 and the time during which the gas diffused out of the opposite surface of membranes 1 and 2 is collected in gas-collecting compartment 4 and 5 can be shortened by moving both membranes 1 and 2. The contact time is preferably not more than $X=0.4$ and more preferably not more than $X=0.2$, and the collection time is preferably not more than $X=0.4$ and more preferably not more than $X=0.2$.

Upon leaving the gas-feeding compartment 3, those portions of membranes 1 and 2 which have been contacted with the gaseous mixture enter evacuation compartments 6, where the gas remaining in these membranes is removed with the aid of a vacuum pump 7. To complete the gas evacuation the portions should stay in the evacuation compartments enough time, depending upon the pulse duration. Thereafter, those portions of membranes 1 and 2 again enter the gas-feeding compartment 3 and provide refreshed surfaces containing no gas. The pulse duration plus the residence time of the portions in the evacuation compartments makes a cycle of the continuous process. The cycle is not more than $X=1$, and not less than $X=0.4$.

Thus, a gas enriched with the lighter component is withdrawn from gas-collecting compartments 4 and 5 by way of a pipe line 9. On the other hand, a gas enriched with the heavier component is left in gas-feeding compartment 3. This gas is withdrawn through a valve 11. The gas removed from membranes 1 and 2 is withdrawn from evacuation compartments 6 with the aid of vacuum pump 7 and then introduced into gas-feeding compartment 3 together with a fresh gaseous mixture fed thereto by way of valve 10.

In the above-described manner, the diffused-out gas can be collected and withdrawn continuously. This permits easy operation and produces a large amount of gas enriched with the lighter component. At the same time, the heavier component can also be rapidly concentrated in gas-feeding compartment 3.

If it is desired to concentrate the heavier component of a gaseous mixture, the gas left in gas-feeding compartment 3 is collected, while if it is desired to concentrate the lighter component, the diffused-out gas is collected.

It is to be understood that various changes and modifications may be made in the concentrators of FIGS. 1 and 2 without departing from the spirit and scope of this invention. For example, the membrane 2 and the gas-collecting compartment 4 can be omitted in the concentrator of FIG. 1.

The present invention is useful for the purpose of concentrating a component of various gaseous mixtures. However, it can preferably be applied to the separation of deuterium and the enrichment of uranium.

In accordance with this invention, the lighter component of a gaseous mixture composed of substances resembling in molecular weight can be concentrated and/or separated by using a smaller number of stages than required by the conventional steady-state diffusion process. Moreover, the process of this invention can be carried out in a continuous manner, whereby the throughput of a gaseous mixture is increased and both the lighter and the heavier component thereof are concentrated simultaneously.

The present invention will be more fully understood by reference to the following examples. However, these examples are intended merely to illustrate the practice of the invention and are not to be construed to limit the scope of the invention.

EXAMPLE 1

The lighter component, or hydrogen, of a gaseous mixture of hydrogen and helium concentrated by using a 0.4 cm thick Vycor glass sheet (Code No. 7930, manufactured and sold by Corning Glass Works, U.S.A.) as the separating medium. This glass sheet has a porosity of 28% and a mean pore diameter of 40 Angstroms.

When a gas having a concentration C is fed in the form of a pulse to one surface of a porous membrane, the flux of the gas diffused out of the opposite surface of the membrane is theoretically given by the amount of gas(S) differentiated with respect to time(T). Accordingly, the flux ratio of the lighter to the heavier component is $$\frac{dS_1/dT}{dS_2/dT} = \frac{C_1}{C_2} \frac{dR_1/dT}{dR_2/dT} \quad (4)$$

Then, the enrichment factor is given by $$\frac{dR_1/dT}{dR_2/dT} - 1 \quad (5)$$

Assuming that $T = \infty$, Equation (5) is reduced to $D_1/D_2 - 1$ which is the same as Equation (3) applicable to the case of steady-state diffusion.

Measured values of the enrichment factor for the lighter component, or hydrogen, are shown in Table 2 together with the corresponding theoretical values calculated from Equation (5). It may be seen from the data shown in Table 2 that both values are in good agreement. Specifically, as the time becomes longer, the enrichment factor decreases and approaches the value of 41% which is obtained from Equation (3) in the case of steady-state diffusion. However, the gas diffused out of the opposite surface of the membrane during a short transient period is highly enriched with hydrogen.

TABLE 1

| Time (sec) | Enrichment Factor for Hydrogen (%) | |
|---|---|---|
| | Measured Value | Theoretical Value |
| 2.5 | 134 | 135 |
| 3.5 | 90 | 93 |
| 4.5 | 75 | 74 |
| 5.5 | 62 | 62 |
| 6.5 | 55 | 55 |
| 7.5 | 50 | 51 |
| 8.5 | 48 | 48 |
| 9.5 | 46 | 45 |
| 10.5 | 45 | 44 |
| 12.5 | 43 | 42 |
| 14.5 | 42 | 42 |
| 16.5 | 42 | 41 |
| 18.5 | 41 | 41 |
| 20.5 | 41 | 41 |

EXAMPLE 2

In a concentrator of the type illustrated in FIG. 1, the two running belts are composed of porous membranes having a porosity of 30%, an intramembranous Knudsen diffusion coefficient of 0.0018 cm$^2$/sec, and a thickness of 0.3 mm. The distance between these membranes is 6 cm, the time required for each rotation of the membranes is 0.1 seconds and the residence time of the membranes in the gas-feeding compartment is 0.009 seconds.

A gaseous mixture consisting of 0.015% deuterium and 99.985% light hydrogen is fed to the gas-feeding compartment and the concentrator is operated for 30 minutes. As a result, 39.1% of the deuterium is diffused out and 60.9% is left in the gas-feeding compartment, while 92.6% of the light hydrogen is diffused out and 7.4% is left in the gas-feeding compartment. Accordingly, the concentration of deuterium in the remaining gas is 0.12% and this corresponds to an eightfold enrichment. On the other hand, the gas diffused out of the membranes is collected. This gas is found to have a light hydrogen concentration of 99.994% and to be richer in light hydrogen than the original gaseous mixture.

EXAMPLE 3

Generally, the enrichment of uranium is carried out in a cascade of steady-state diffusion stages where the gas fed to a stage consists of the enriched gas resulting from the next below stage and of the depleted gas resulting from the next above stage. Natural uranium, which contains 0.7% uranium-235, must be enriched to a uranium-235 concentration of 3% for use as fuel in light water nuclear reactors. Usually, the enrichment of uranium hexafluoride gas at a cut of 50% (i.e., in such a way that 50% of the feed gas is diffused out) requires a total of 731 stages.

In accordance with this invention, a concentrator of the type illustrated in FIG. 2 is used for the enrichment of uranium hexafluoride gas. The porous membranes included in this concentrator has a porosity of 30%, an intramembranous Knudsen diffusion coefficient of 0.0002 cm$^2$/sec, and a thickness of 0.1 mm. The distance between these membranes in the gas-feeding compartment is 5 cm, the time required for each rotation of the membranes is 0.1047 seconds, and the residence time of the membranes in the gas-feeding compartment is 0.015 seconds. When this concentrator is operated for 18.3 minutes at a cut of 50%, the enrichment of uranium hexafluoride gas from a uranium-235 concentration of 0.7% to 3% can be carried out by using a total of 197 stages. Moreover, as much as 0.689 moles of the enriched gas containing 3% uranium-235 is yielded from 100 moles of the feed gas. For purposes of comparison, the same membranes are used in the conventional steady-state diffusion process. In this case, the yield of the enriched gas is only 0.186 moles per 100 moles of the feed gas.

What is claimed is:

1. A process for concentrating a component of a gaseous mixture by Knudsen diffusion which comprises feeding a gaseous mixture is fed to one surface of a renewable portion of a porous membrane intermittently in the form of a pulse and collecting the gas diffused out of the opposite surface of said membrane under Knudsen's conditions during a transient period having length of not less than $x=0.01$ but not more than $x=0.4$, where $x=DT_2/aL$ wherein D is the intramembranous Knudsen diffusion coefficient, T is time (in seconds), a is the porosity of said membrane and L is the thickness (in cm) of said membrane, the collected diffused gas being hence enriched with the lighter component of said gaseous mixture.

2. The process according to claim 1 wherein said gaseous mixture is fed in the form of a pulse having a duration of not less than $x=0.01$ but not more than $x=0.4$, where $x=DT_2/aL$ wherein D is the intramembranous Knudsen diffusion coefficient, T is time (in seconds), a is the porosity of said membrane and L is the thickness (in cm) of said membrane.

3. A continuous process for concentrating a component of a gaseous mixture by Knudsen diffusion which comprises feeding a gaseous mixture continuously to a gas-feeding zone having at least one boundary wall constituted of a porous membrane, moving said membrane so as to renew its portion to be contacted with said gaseous mixture at cyclic intervals of time of not less than $x=0.4$ but not more than $x=1$, where $x=DT_2/aL$ wherein D is the intramembranous Knudsen diffusion coefficient, T is time (in seconds), a is the porosity of said membrane and L is the thickness (in cm) of said membrane, whereby the lighter component of said gaseous mixture is preferentially diffused out of the opposite surface of said membrane under Knudsen's conditions and the heavier component thereby is largely left in said gas-feeding zone, and collecting the lighter component diffused out and the heavier component left in said gas feeding zone, respectively.

* * * * *